United States Patent [19]

Tashiro et al.

[11] Patent Number: 4,709,936
[45] Date of Patent: Dec. 1, 1987

[54] STEERING ASSEMBLY FOR MOTOR VEHICLE

[75] Inventors: Yutaka Tashiro; Shoichi Sano, both of Saitama, Japan

[73] Assignee: Honda Giken Kogyo Kabushiki Kaisha, Tokyo, Japan

[21] Appl. No.: 905,755

[22] Filed: Sep. 9, 1986

[30] Foreign Application Priority Data

Sep. 11, 1985 [JP] Japan ................................. 60-201430
Sep. 11, 1985 [JP] Japan ................................. 60-201431

[51] Int. Cl.$^4$ .......................... B62D 5/06; B62D 3/02
[52] U.S. Cl. .................................... 280/91; 180/140; 180/234; 280/95 R; 280/96
[58] Field of Search ............... 180/140, 234, 236, 240; 280/91, 95 A, 96, 98, 99, 95 R

[56] References Cited

U.S. PATENT DOCUMENTS 4,519,627 5/1985 Shibahata et al. .................. 280/701
4,538,824 9/1985 Furukawa et al. .................... 280/91
4,545,602 10/1985 Shibahata ........................... 280/701

Primary Examiner—Richard A. Bertsch
Attorney, Agent, or Firm—Bogucki, Scherlacher, Mok & Roth

[57] ABSTRACT

A steering assembly for a motor vehicle includes a trailing arm pivotally supported on a pivot shaft extending substantially transversely of the motor vehicle and rotatably supporting a wheel at a rear end thereof, at least three links each having one end pivotally coupled to said trailing arm and extending substantially transversely of the motor vehicle, and a steering gear box for steering the wheel. One of the three links, i.e., the first link, has an opposite end operatively coupled to said steering gear box. The other two links are coupled to the trailing arm by respective joints interconnected by a straight line serving as a kingpin axis serving as a steering center of the wheel.

14 Claims, 3 Drawing Figures

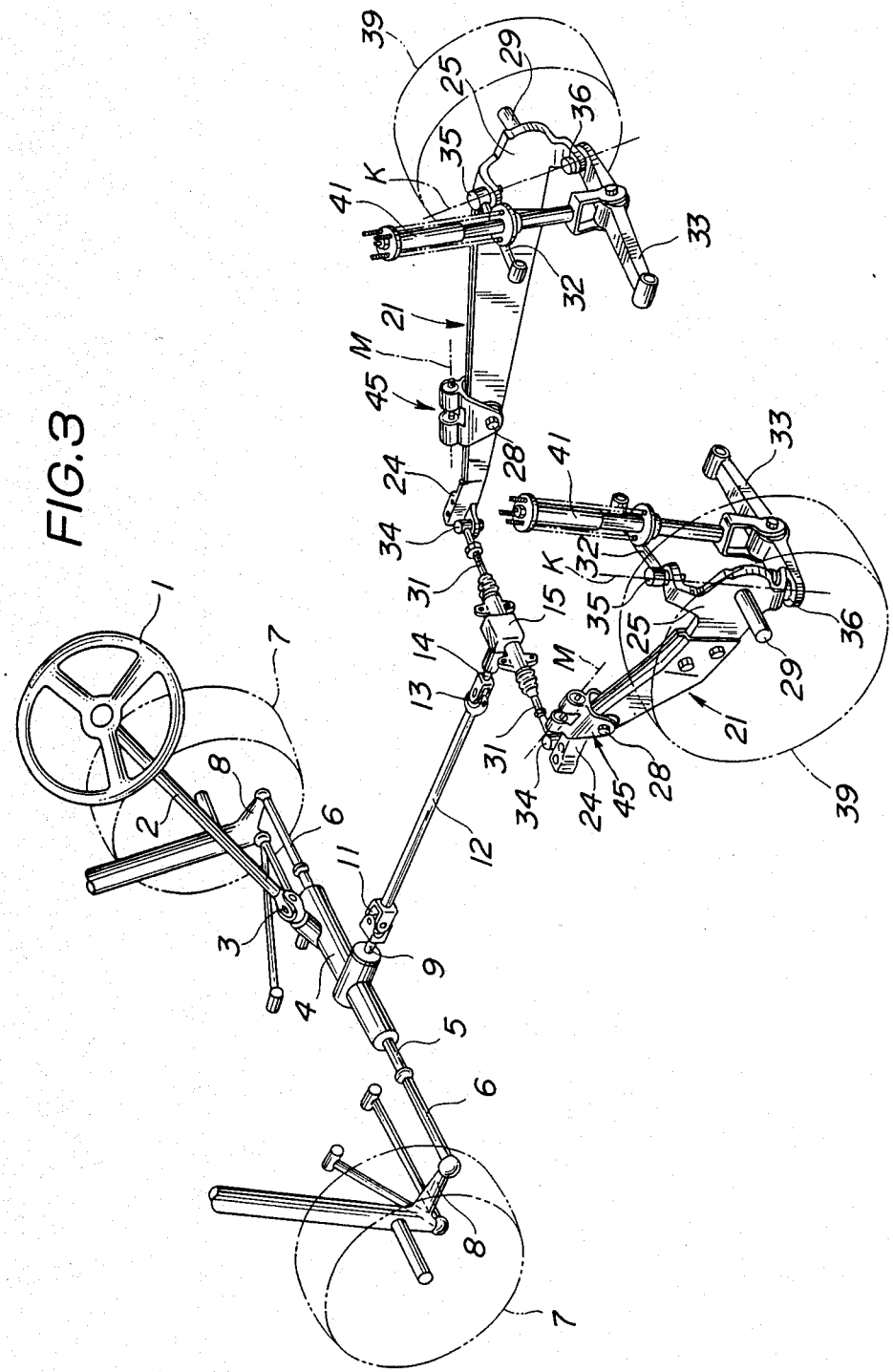

STEERING ASSEMBLY FOR MOTOR VEHICLE

BACKGROUND OF THE INVENTION

1. Field of the Invention:

The present invention relates to a steering assembly for use in a motor vehicle, and more particularly to a rear wheel steering assembly for use in a motor vehicle having steerable front and rear wheels.

2. Description of the Relevant Art:

Recently, some motor vehicles are equipped with a system for steering rear wheels as well as front wheels. In general, such a front and rear wheel steering system includes, in addition to a conventional front wheel steering assembly, a similar rear wheel steering assembly comprising rear wheel steering components such as knuckle arms and tie rods which are operatively coupled to a steering wheel and associated with rear suspension mechanisms.

Because of these additional rear wheel steering components required to steer the rear wheels, the number of parts mounted on a rear vehicle frame portion and operatively associated with the rear wheels is increased.

SUMMARY OF THE INVENTION

In view of the aforesaid drawback of the conventional rear wheel steering assembly, it is an object of the present invention to provide a steering assembly for use in a motor vehicle, particularly a rear wheel steering assembly for use in a motor vehicle.

According to the steering system of the present invention, the number of parts operatively associated with a rear wheel is reduced to provide a relatively large rear space which can effectively be utilized for installation of a fuel tank or other components.

To achieve the above object, a steering assembly of the present invention includes a trailing arm pivotally supported on a pivot shaft extending substantially transversely of a vehicle frame and rotatably supporting a rear wheel at a rear end thereof, a rear steering gear box for steering the rear wheel, and three links extending substantially transversely of the vehicle frame. Two out of the three links are coupled by joints to the trailing arm in the vicinity of a steering center of the rear wheel, and the remaining link has one end mounted on the trailing arm at a front end thereof and the other end mounted in the rear steering gear box. Preferably, the steering assembly includes a holder having a lower end by which the pivot shaft is pivotally supported and an upper end swingably supported on a second pivot shaft extending substantially longitudinally of the vehicle frame so that the trailing arm can be angularly moved transversely.

In this three-link trailing arm assembly, since the link on the front end of the trailing arm is operatively coupled to the rear steering gear box, this link can double as a rear wheel steering tie rod for enabling the trailing arm to be angularly moved transversely about the second pivot shaft, so that the trailing arm can function as a knuckle arm for steering the rear wheel. The joints by which the two links are coupled to the trailing arm near the steering center of the rear wheel jointly serve as a kingpin axis about which the rear wheel is steerable. The link or steering tie rod on the front end of the trailing arm is widely spaced from the kingpin axis, so that the lever ratio may be large, and tolerances of the gear box and the steering tie rod link may also be large. A fuel tank or other parts may easily be installed in a relatively large space defined between the steering tie rod link and the two links coupled by the joints to the trailing arm.

The above and further objects, details and advantages of the present invention will become apparent from the following detailed description of a preferred embodiment thereof, when read in conjunction with the accompanying accompanying drawings.

BRIEF DESCRIPTION OF THE DRAWINGS

FIG. 3 is a perspective view of the steering assembly incorporated in a non-rear-wheel-drive motor vehicle.

DETAILED DESCRIPTION OF THE PREFERRED EMBODIMENT

Figure 1:
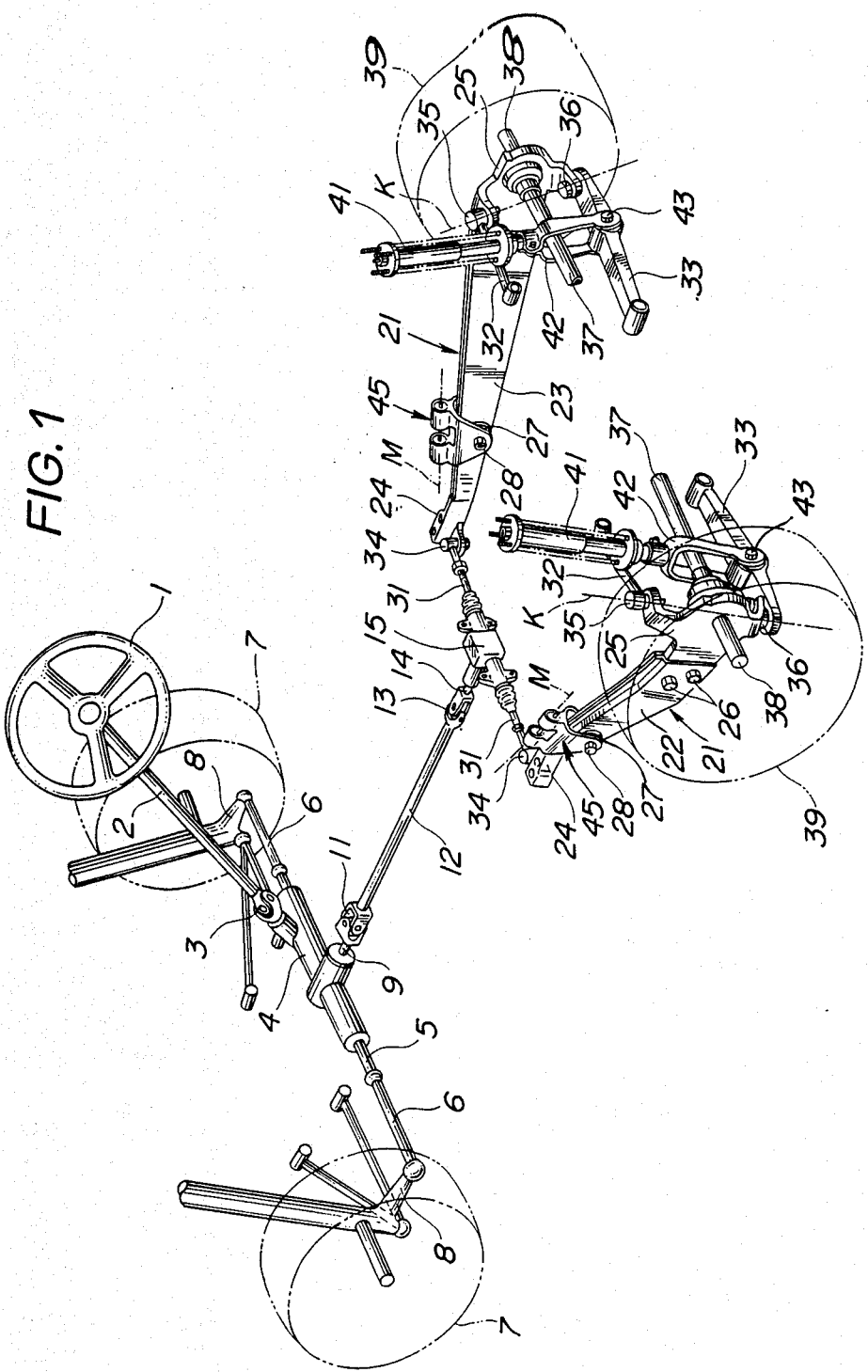
FIG. 1 is a perspective view of a steering assembly of the present invention, which is incorporated in a rear-wheel-drive motor vehicle.

FIG. 1 shows a front and rear wheel steering system including a rear wheel steering assembly according to the present invention.

A steering wheel 1 is coupled to a steering shaft 2 operatively joined by a universal joint 3 to a rack-and-pinion-type front steering gear box 4 having a rack shaft 5 with its opposite ends connected to two tie rods 6, respectively. The tie rods 6 are operatively connected to respective knuckle arms 8 on which front wheels 7 are rotatably mounted.

A front pinion shaft 9 meshing with the rack shaft 5 projects rearwardly from the front steering gear box 4 and is coupled by a front universal joint 11 to a linkage shaft 12, which in turn is coupled by a rear universal joint 13 to a rear pinion shaft 14 operatively coupled to a rear steering gear box 15.

Figure 2:
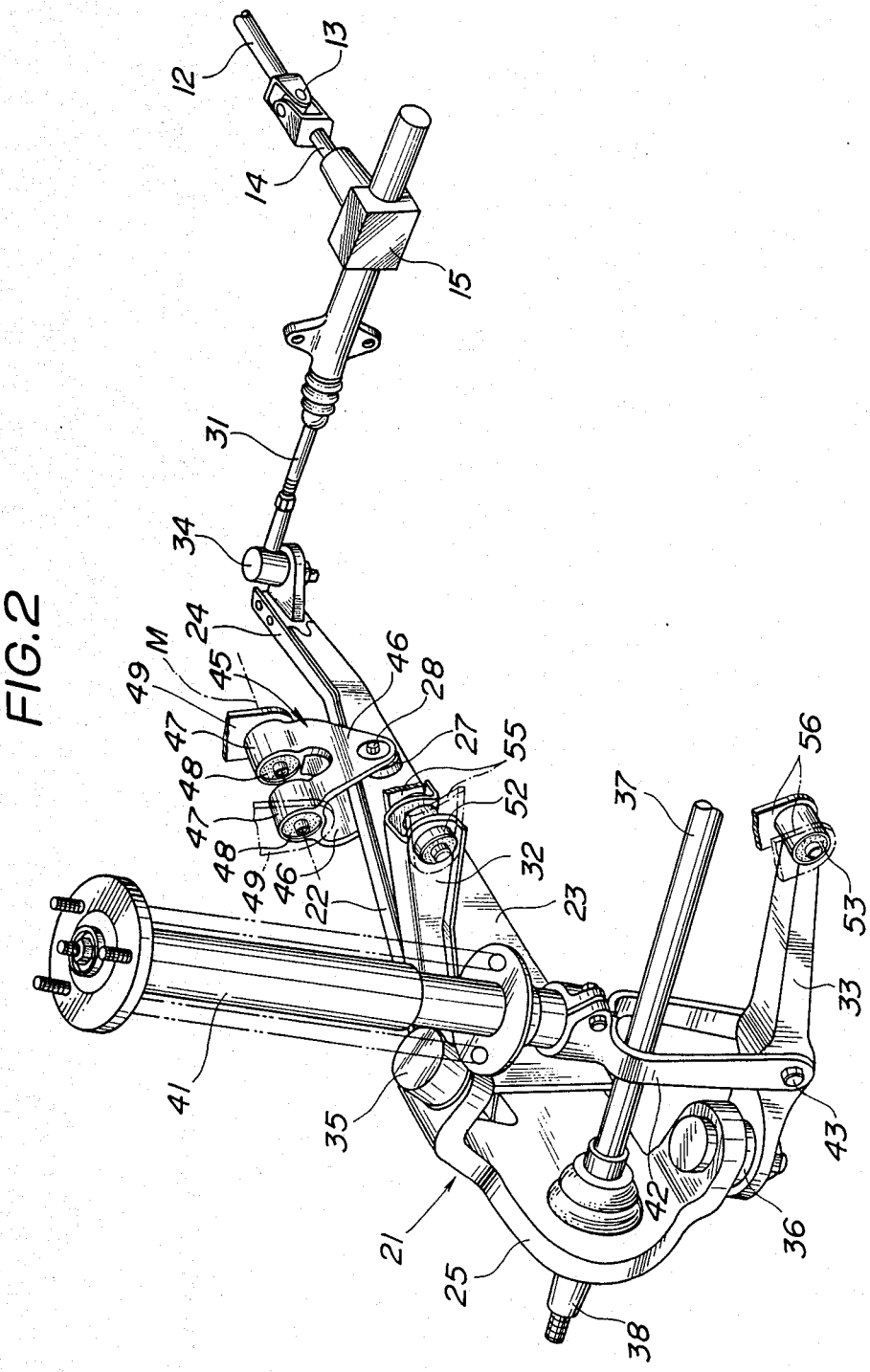
FIG. 2 is an enlarged perspective view of the steering assembly associated with a rear wheel suspension.

As illustrated in FIGS. 1 and 2, each of two rear suspensions includes a trailing arm 21 extending substantially longitudinally of a vehicle frame. The trailing arm 21 comprises a plate 22 formed preferably by pressing and extending in a vertical plane and a reinforcing plate 23 joined to plate 22 over its recessed surface to provide a rigid body. A knuckle 25 is securely coupled by two vertically spaced bolts 26 to the rear end of the trailing arm 21. A rubber bushing 27 with a tube is mounted on the traling arm 21 near its front end, the tube of the rubber bushing 27 having an axis extending substantially transversely of the vehicle frame. A pivot shaft 28 is inserted through the tube of the rubber bushing 27, and supported by a holder 45 having two laterally spaced depending members 46. The depending members 46 have front and rear portions spaced from each other and are interconnected by two spaced tubular members 47 which are concentric with each other. Rubber bushings 48 with tubes are fixedly mounted in the tubular members 47, respectively. The rubber bushing 27 on the trailing arm 21 is positioned between the depending members 46 of the holder 45, and the pivot shaft 28 is supported on the depending members 46 so that the trailing arm 21 is pivotally mounted on the holder 45.

Three lateral links 31, 32, 33 extending substantially transversely of the vehicle frame are coupled to the trailing arm 21. The first lateral link 31 has an outer end coupled by a ball joint 34 to the front end of an extension 24 of the trailing arm 21 which extends forwardly of the rubber bushing 27. The second and third lateral links 32, 33 have outer ends coupled by ball joints 35, 36, respectively, to the knuckle 25 at its upper and lower ends, respectively.

An axle 38 connected to a drive shaft 37 is rotatably supported on the knuckle 25 and projects outwardly from the knuckle 25. A rear wheel 39 is mounted on the axle 38. A damper 41 has a lower end connected by a support pin 43 through a forked member 42 to the third lateral link 33 near an outer end thereof. The drive shaft 37 extends through the forked member 42.

For assembling each of the trailing arms 21 on the vehicle frame, the inner ends of the second and third lateral links 32, 33 are pivotally supported on brackets 55, 56 of the vehicle frame respectively by rubber bushings 52, 53 with tubes, and then a pivot shaft having an axis M extending substantially longitudinally of the vehicle frame is inserted through the tubes of the rubber bushings 48 in the tubular members 47 of the holder 45 and is connected to respective brackets 49 of the vehicle frame. The upper end of the damper 41 is joined to the vehicle frame.

Then, the inner ends of the first lateral links 31 coupled to the front ends of the trailing arms 21 are inserted into the rear steering gear box 15 and operatively coupled as by joints to the opposite ends of a rack shaft (not shown) which is held in mesh with the rear pinion shaft 14.

As described above, the pivot shaft 28 on the trailing arm 21 is supported by the holder 45 which is pivotally supported by the longitudinal pivot shaft on the vehicle frame. Therefore, transverse movement of the trailing arm 21 due to swinging movement of the lateral links 31, 32, 33 at the time the rear wheel 39 bounds and rebounds is facilitated by movement of the pivot shaft 28 caused by swinging movement of the holder 45 about the axis M of the longitudinal pivot shaft.

In the three-link trailing arm assembly constructed as above, which serves as a rear suspension, the inner end of the first lateral link 31 coupled to the front extension 24 of the trailing arm 21 is operatively coupled to the rear steering gear box 15. Therefore, when the steering wheel 1 is turned to induce transverse movement of the first lateral link 31, the trailing arm 21 can be moved transversely about the axis M of the longitudinal pivot shaft that is located rearwardly of the first lateral link 31. Therefore, the rear wheels 39 can be steered with the front wheels 7 in response to turning movement of the steering wheel 1.

Inasmuch as the first lateral link 31 serves as a rear wheel steering tie rod and the trailing arm 21 serves as a knuckle arm, the number of components associated with the rear wheel 29 is not increased to provide the assembly for steering the rear wheel 39.

The ball joints 35, 36 by which the second and third lateral links 32 33 positioned above and below the trailing arm 21 are coupled to the knuckle 25 jointly provide a kingpin axis K extending along a straight line connecting these ball joints 35, 36 for steering the rear wheel 29. Since the first lateral link 31 positioned most remotely from the kingpin axis K serves as the rear wheel steering tie rod, the lever ratio is large, and the rear gear box 15 and the tie rod link 31 can be manufactured with relativley low dimensional accuracy.

The space between the first lateral link 31 and the second and third lateral links 32, 33 is relatively large since the first lateral link 31 is positioned at the front end of the trailing end 21 and the second and third lateral links 32, 33 are positioned at the rear end of the trailing end 21. A fuel tank or other components can easily be installed in such a large space.

The rear wheel steering assembly of the present invention can also be incorporated in a motor vehicle which is not of the rear-wheel-drive type. More specifically, as shown in FIG. 3, an axle 29 is fixed to the knuckle 25 on the rear end of each of the trailing arms 21, and the rear wheel 39 is idly rotatably mounted on the axle 29. The other structural details are the same as those shown in FIG. 1.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A steering assembly in a motor vehicle, comprising:
   a trailing arm pivotally supported on a pivot shaft extending substantially transversely of the motor vehicle and rotatably supporting a wheel at a rear end thereof;
   a first link having one end pivotally coupled to said trailing arm and extending substantially transversely of the motor vehicle to a second end opposite the one end that is operatively coupled to said steering gear box;
   a second link having one end pivotally coupled to an upper potion of sail trailing arm at a rear end thereof by a link in the vicinity of a steering center about which said wheel is steerable and having a second end opposite the one end pivotally supported on a vehicle frame of the motor vehicle;
   a third link having one end pivotally coupled to a lower portion of said trailing arm at the rear end thereof by a link in the vicinity of a steering center about which said wheel is steerable with a straight line serving as a kingpin axis for steering said wheel passing through the joints connecting the second and third links to the trailing arm, the third link further having a second end opposite the one end pivotally supported in a vehicle frame of the motor vehicle; and
   a steering gear box for steering the wheel.

2. A steering assembly according to claim 1, further including a damper having one end pivotally mounted on said third link near the joint by which said third link is coupled to said trailing arm.

3. A steering assembly according to claim 2, further including a drive shaft for driving said wheel, said drive shaft extending between said second and third links and coupled to said wheel through the rear end of said trailing arm.

4. A steering assembly according to claim 3, further including a holder having a lower end on which said pivot shaft is pivotally supported and an upper end pivotally supported on a second pivot shaft extending substantially longitudinally of the motor vehicle so that said trailing arm can be angularly moved substantially transversely of the motor vehicle through said holder.

5. A steering assembly according to claim 4, wherein said second pivot shaft is mounted on said vehicle frame, the opposite ends of said second and third links and said damper being pivotally supported on said vehicle frame.

6. A steering assembly according to claim 1, further including a holder having a lower end on which said pivot shaft is pivotally supported and an upper end pivotally supported on a second pivot shaft extending substantially longitudinally of the motor vehicle so that said trailing arm can be angularly moved substantially transversely of the motor vehicle through said holder.

7. A steering assembly according to claim 6, further including a vehicle frame, said second pivot shaft being mounted on said vehicle frame, said second and third links having opposite ends pivotally supported on said vehicle frame.

8. A steering system in a motor vehicle, comprising:
a steering frame;
a steering shaft mounted substantially vertically on a front portion of said vehicle frame;
a front steering gear box to which a lower end of the said steering shaft is operatively coupled;
a linkage shaft extending substantially longitudinally of the motor vehicle and having one end operatively coupled to said front steering gear box;
a rear steering gear box to which an opposite end of said linkage shaft is operatively coupled;
a trailing arm pivotally supported on a pivot shaft extending substantially transversely of the motor vehicle and rotatably supporting a wheel at a rear end thereof;
a first link having one end pivotally coupled to the trailing arm and extending substantially transversely of the motor vehicle to a second end opposite the one end that is operatively coupled to the rear steering gear box;
a second link having one end pivotally coupled to an upper portion of said trailing arm at a rear end thereof in the vicinity of a steering center about which said wheel is steerable and extending substantially transversely of the motor vehicle to a second end opposite the one end that is pivotally supported in the vehicle frame;
a third link having one end pivotally coupled to a lower portion of said trailing arm at a rear end thereof in the vicinity of the steering center about which said wheel is steerable and extending transversely of the motor vehicle to a second end that is pivotally supported on the vehicle frame; and
first and second joints coupling the one ends of the second and third respectively to the trailing arm, the first and second joints being positioned along a straight line serving as a kingpin axis for steering said wheel.

9. A steering system according to claim 8, further including a damper having one end pivotally mounted on said third link near the joint by which said third link is coupled to said trailing arm.

10. A steering system according to claim 9, further including a drive shaft for driving said wheel, said drive shaft extending between said second and third links and coupled to said wheel through the rear end of said trailing arm.

11. A steering system according to claim 10, further including a holder having a lower end on which said pivot shaft is pivotally supported and an upper end pivotally supported on a second pivot shaft extending substantially longitudinally of the motor vehicle so that said trailing arm can be angularly moved substantially transversely of the motor vehicle through said holder.

12. A steering system according to claim 11, wherein said second pivot shaft is mounted on said vehicle frame, the opposite ends of said second and third links and said damper being pivotally supported on said vehicle frame.

13. A steering system according to claim 8, further including a holder having a lower end on which said pivot shaft is pivotally supported and an upper end pivotally supported on a second pivot shaft extending substantially longitudinally of the motor vehicle so that said trailing arm can be angularly moved substantially transversely of the motor vehicle through said holder.

14. A steering system according to claim 13, wherein said second pivot shaft is mounted on said vehicle frame, said second and third links having opposite ends pivotally supported on said vehicle frame.

* * * * *

UNITED STATES PATENT AND TRADEMARK OFFICE
CERTIFICATE OF CORRECTION

PATENT NO. : 4,709,936

DATED : December 1, 1987

INVENTOR(S) : Y. Tashiro et al

It is certified that error appears in the above-identified patent and that said Letters Patent are hereby corrected as shown below:

Column 2, lines 8-9, after "accompanying" (first occurrence) delete "accompanying" (second occurrence).

Column 3, line 55, after "32" and before "33" insert a comma (--,--);
lines 62-63, replace "relativley" with --relatively--;
line 67, replace "end" with --arm--.

Column 4, line 1, replace "end" with --arm--;
line 34, replace "potion" with --portion--;
line 34, replace "sail" with --said--.

Signed and Sealed this

Sixth Day of December, 1988

Attest:

DONALD J. QUIGG

*Attesting Officer*  *Commissioner of Patents and Trademarks*